Patented Oct. 13, 1925.

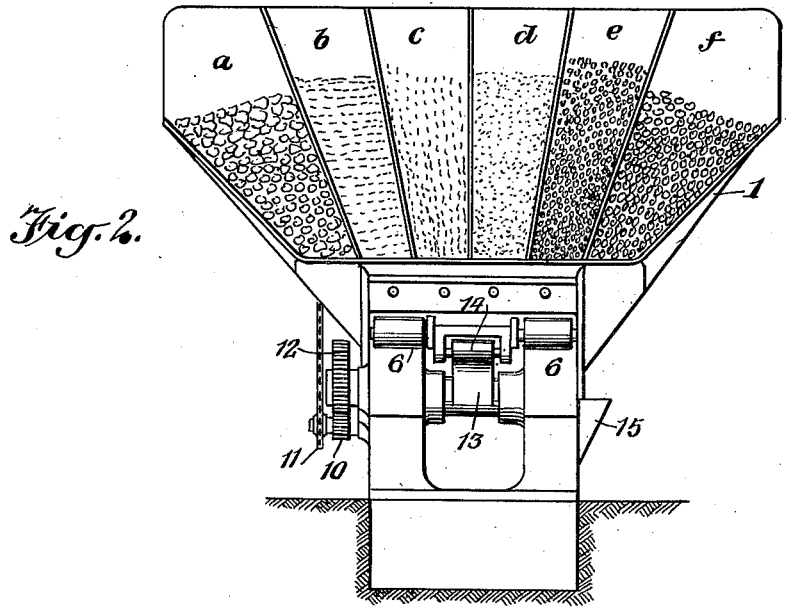
Fig. 2.
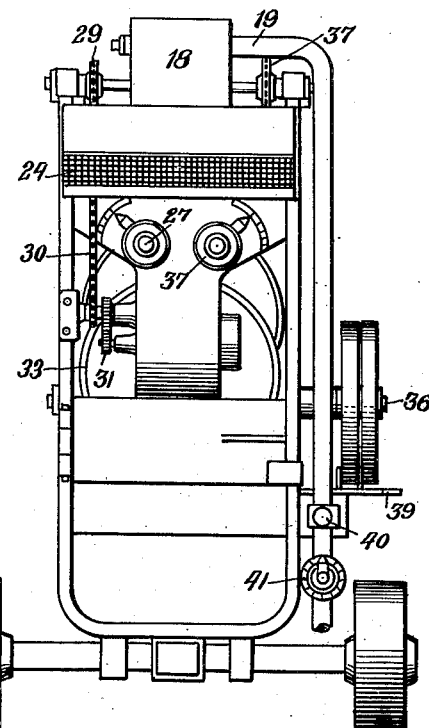
Fig. 2ª.

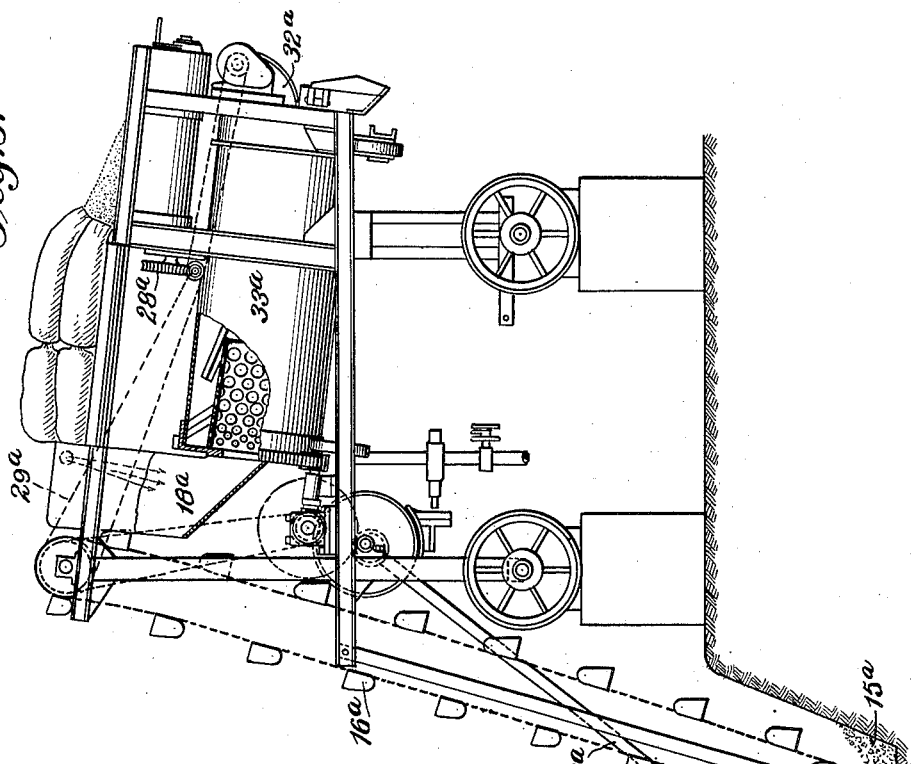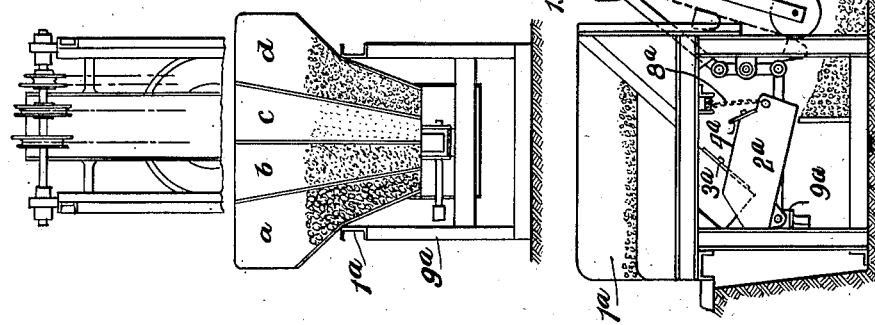

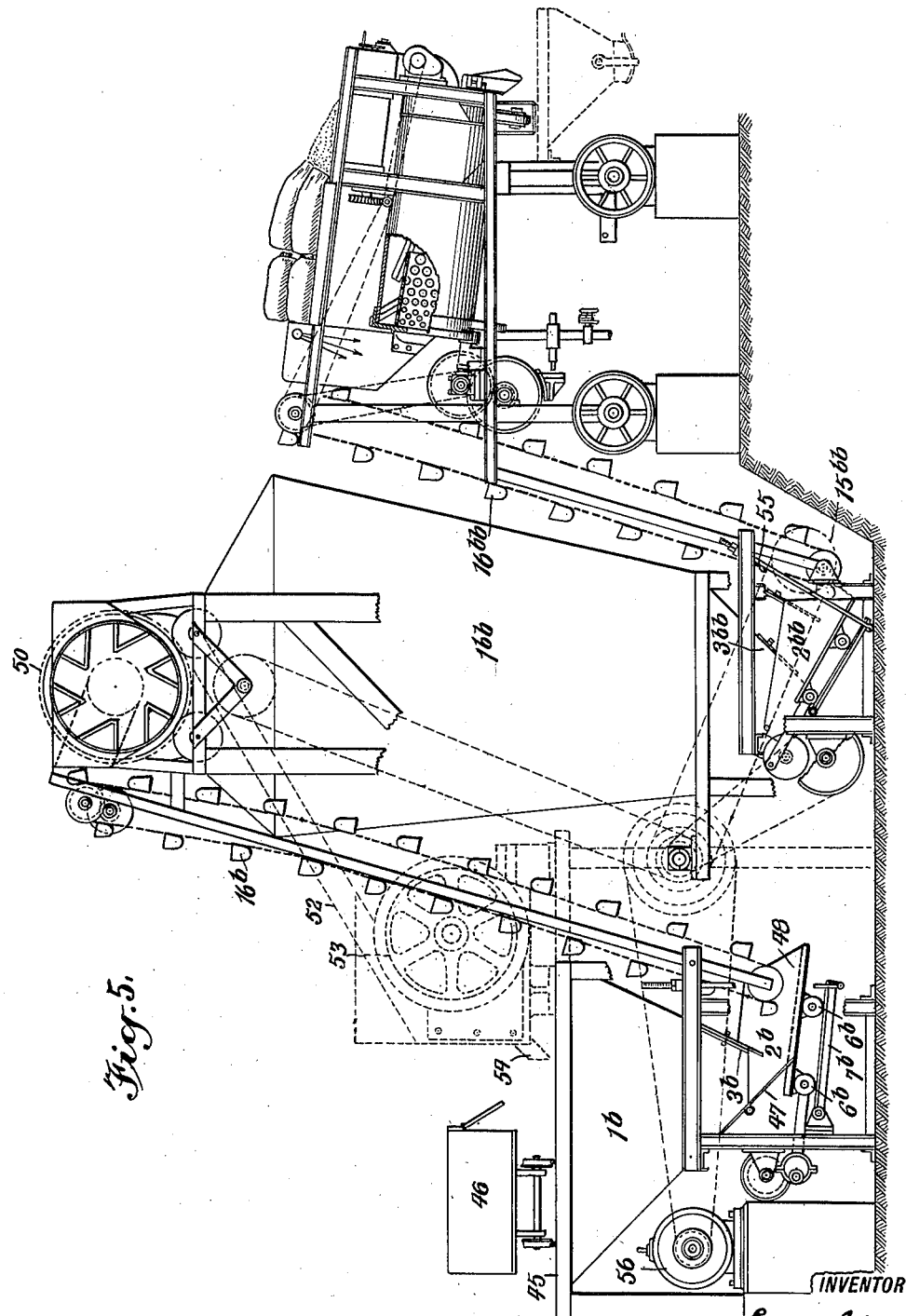

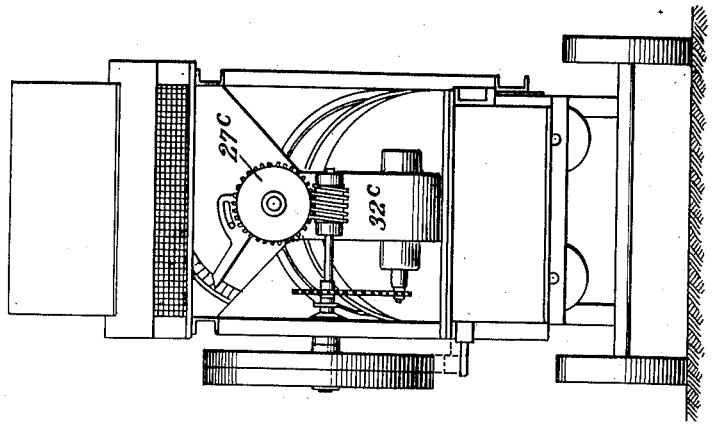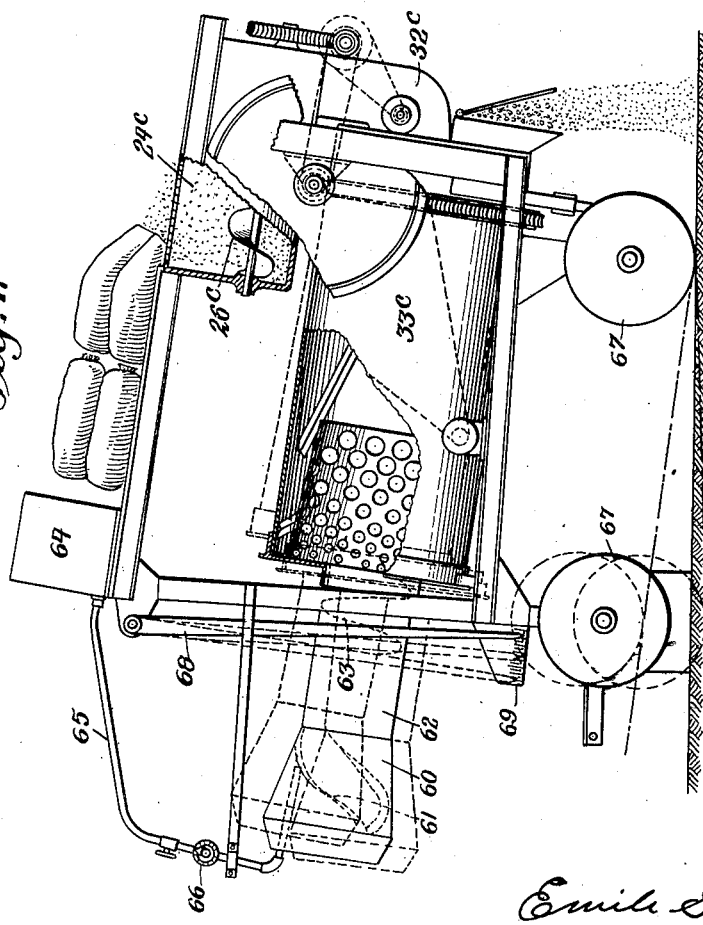

1,557,275

UNITED STATES PATENT OFFICE.

EMILE SPRENGER, OF GOLDACH, SWITZERLAND.

METHOD AND APPARATUS FOR MIXING AND WORKING UP GRANULAR AND PULVERULENT MATERIAL.

Application filed July 13, 1922. Serial No. 574,756.

*To all whom it may concern:*

Be it known that I, EMILE SPRENGER, a citizen of the Swiss Republic and resident of Goldach, in the Canton of St. Gall, Switzerland, have invented certain new and useful Improvements in Methods and Apparatus for Mixing and Working Up Granular and Pulverulent Material, of which the following is a specification.

The mixing of granular and pulverulent substances, as for example for the manufacture of concrete and artificial stone, is a process of the highest importance for the quality of the product. I have, by the means hereinafter to be described, obtained results far in advance of the results heretofore secured either by mechanical or manual processes. The utility of the method and apparatus which I shall describe is not confined to the treatment of materials for concrete manufacture and like purposes, but I refer to this particular art as an example in which the results obtained are particularly dependent on the efficiency of the mixing operation. Scientific data in regard to the action of hydraulic binding agents and to the setting qualities or compositions into which they enter are not very complete, but it has generally been stated that to obtain the best results the body substances, by which I mean sand, pebbles and so on, must be well embedded in binding agents. Furthermore, the spaces between the particles of each size or grade should be completely filled by the smaller particles and a uniformity of composition and ingredients throughout every portion of the mass secured by proper mixing.

I have found that most remarkable results, in regard to the setting and hardening properties of such compositions are obtained when the method of mixing which I shall describe is adopted, and in this method the preliminary working up and mixing of the said body substances plays a part of prime importance. Such treatment, resulting inter alia in cleansing the surfaces of the particles by friction, enables the hydraulic binding agents to operate with an effect far exceeding anything heretofore, to my knowledge, obtained.

By freeing the separate grains of sand and other ingredients in the most perfect manner possible to loosen and remove the coating of dust or other substances thereon, the cement or other hydraulic binding medium will act directly upon the fresh and clean surface of the sand, gravel, etc. The greatly increased strength of the product resulting from the use of my improved process is probably due in part to this cleaning action on the particles, and the avoiding of lines or planes of weakness between the cement and such particles.

I will now describe several forms of apparatus shown in the annexed drawings and suitable for carrying the improved methods into effect. In these drawings:

Fig. 2 is a view of the left hand end of the apparatus shown in Fig. 1.

Figure 1:
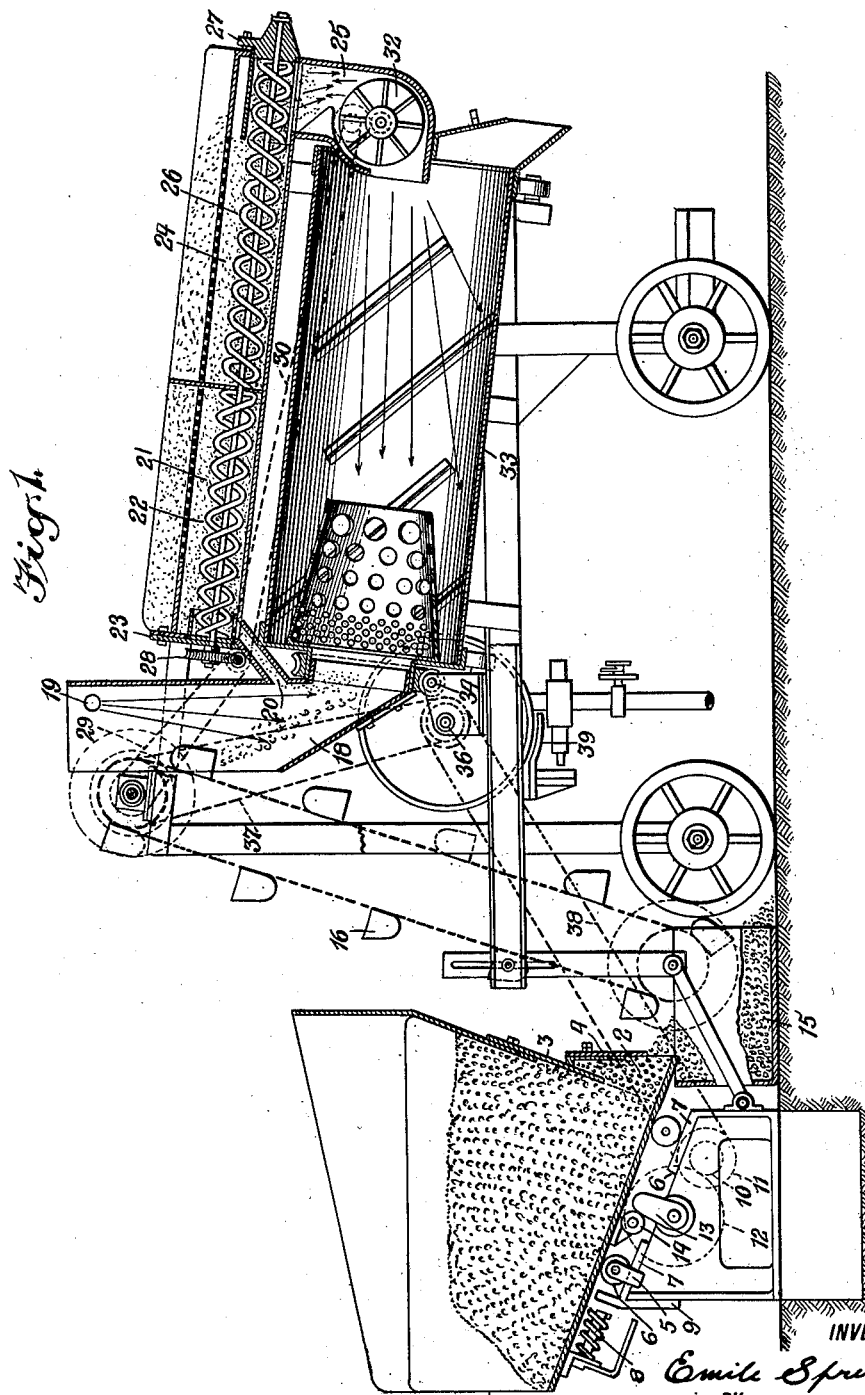
Fig. 1 is a vertical longitudinal section of one form of apparatus, certain of the parts being shown diagrammatically.

Fig. 2ª is a view of the right hand end of the apparatus shown in Fig. 1.

Fig. 3 is a side elevation of another form of apparatus, certain of the parts being broken away.

Fig 4 is a part sectional and part end view on the lines 4—4 of Fig. 3.

Fig. 5 is a side elevation of a further form of apparatus, certain of the parts being shown in section.

Figure 6:
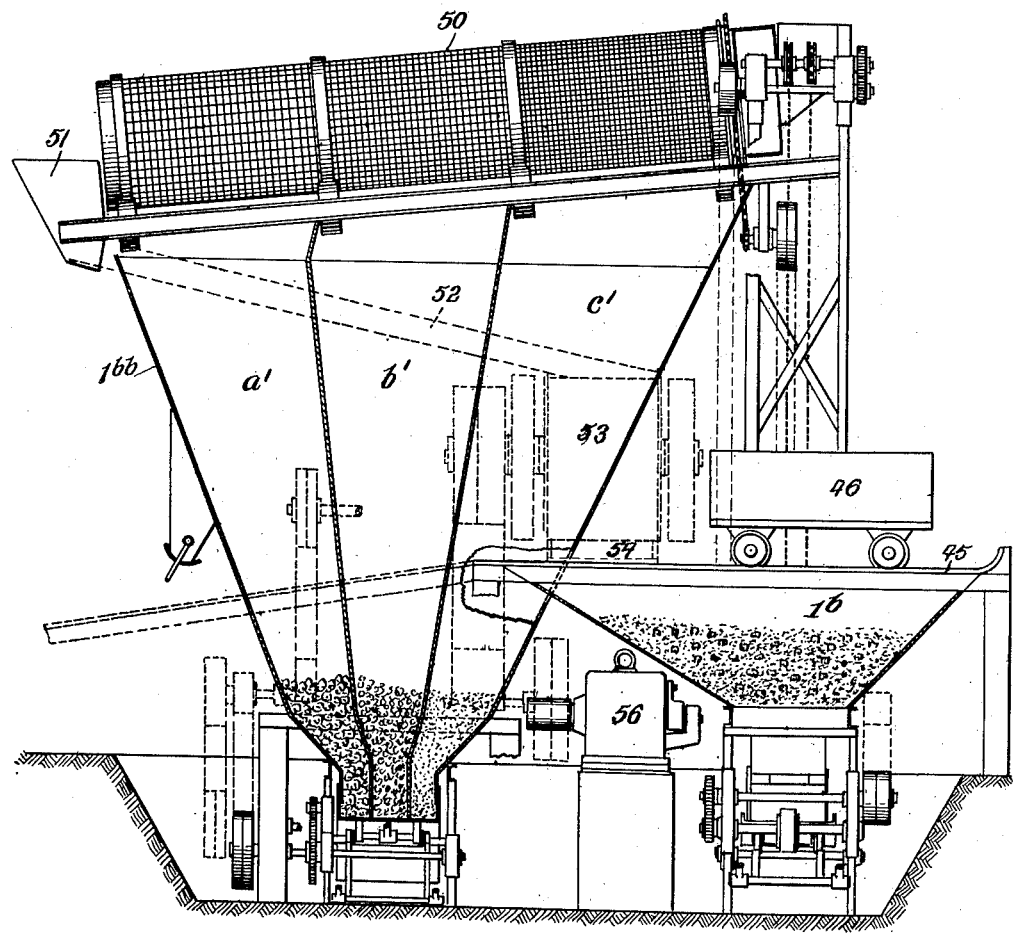

Fig. 6 is a transverse section of the apparatus shown in Fig. 5.

Fig. 7 is a side elevation of a further form, portions being shown in section, and Fig. 8 is an end view of the apparatus shown in Fig. 7.

The apparatus shown in Figs. 1, 2, and 2ª includes a hopper 1 divided into compartments $a$, $b$, $c$, $d$, $e$, $f$, for various granular materials to be mixed. These compartments all discharge their contents into a premixing chamber 2 through openings regulatable by means of doors or valves 3, so that the proportions in which the materials enter the chamber 2 can be accurately regulated. The discharge from the chamber 2 is regulated by means of a door or valve 4, which regulates the final rate of discharge from the hopper. The hopper is mounted on wheels or rollers 6 working on an inclined run-way 7, the axle of the upper rollers having depending lugs 5 which engage over the edges of the run-way. A gear 10 actuated by a sprocket wheel 11 drives a gear 12, which latter has a cam 13 adapted, in the course of its rotation, to engage a roller 14 beneath the floor of the hopper. This moves the hopper up the run-way and then allows it to run back until stopped by buffer springs 8 which strike the frame 9 of the run-way.

The chamber 2 discharges into a box 15, from which the mixed granular materials are taken by a bucket conveyor 16. The buckets discharge the mixture into a chute 18, at the top of which there is a sprinkler 19 enabling the mixture to be wet if required. This chute has a lateral inlet or inlets 20 below the sprinkler and leading from a feed box or boxes 21, from which an additional substance or additional substances can be discharged into the chute by suitable feeding means, such for instance as a worm or worms 22, the rate of discharge being regulated by a valve or valves 23. The feed box is charged from the top through a sieve, which separate out large pieces. In line with the box or boxes 21 there are boxes 24 with feed worms 26 therein. These boxes are charged through sieves at the top and discharged through floor openings regulated by valves 27 into a vertical chute 25. The feed worms may be on the same shaft but operate in opposite directions. They are actuated by worm gears 28 and a chain 29 from the top shaft of the bucket conveyor. The chute 25 delivers the materials from the boxes 24 to a centrifugal distributer 32 actuated by a chain 30 and suitable gearing 31. This distributer projects the material into one end of a rotary mixing drum 33, which at the opposite end receives the material from the chute 18 and passes it through a perforated funnel or nozzle into the drum. This material travels through the drum towards a discharge chute below the distributer 32. In the course of its passage through the drum it is tumbled and mixed by blades on the wall of the drum and at the same time intimately mixed with what may be called the secondary material projected in the opposite direction by the distributer 32.

The drum is rotated by means of worm gear 34 actuated by a gear wheel on the main shaft 36. This main shaft also drives the bucket conveyor by means of a chain 37, and the hopper cam by means of a chain 38. The main shaft is driven by a pulley and belt, and the belt shifter 39 is preferably operatively connected to the lever or handle of a stop cock 40 controlling the supply of liquid to the sprinkler 19, so that the supply is turned on and cut off simultaneously with the starting and stopping of the machine. The rate of supply of the liquid is regulated by a valve 41. The mixing drum and appurtenant parts are shown as mounted on a traveling frame.

It will be clear from the foregoing description of the apparatus that the hopper 1 serves to produce what may be called a primary mixture, the constituents of which are automatically proportioned as required and are, moreover, by the jogging action of the hopper, intimately worked up by themselves before subsequent admixtures are introduced. The manual work at this stage is confined to filling or partly filling any or all of the compartments of the hopper with the selected substances, either substances of different kinds or substances of different degrees of coarseness; say, for example: (a) Broken stone; (b) coarse fragmentary sand; (c) finer fragmentary sand; (d) powdered stone; (e) ordinary sand; (f) pebbles. No regard to proportions need be had in charging the hopper, which can be done while the machine is in operation. The measuring is performed by the valves 3. In the box 2 the materials are temporarily retained and intimately comingled by the jogging action of the hopper, which causes the interstices between the particles to be evenly filled up, so that an accurately proportioned and very uniform primary mixture is produced by purely mechanical means. At the same time the particles are subjected to extensive friction with each other and thus worked up into a condition for intimate agglomeration. The primary mixture, as stated, passes into the mixing drum with or without additions received in the chute 18, and then receives what may be called the secondary mixture, say a mixture of lime, gypsum and like materials. These materials have been intimately mixed in the course of their passage to and through the distributer 32, and when projected into the drum by the distributer they are spread and separated according to the degrees of fineness and thus caused to envelope and commingle intimately with the particles of the primary mixture. After the whole has been thoroughly mixed it is discharged from the drum. It will be noted that the supply of liquid and also the supply of any particular granular substance can be regulated or stopped at any time in the course of the work, by operating the proper valve.

In Figs. 3 and 4 there is illustrated a modified form of apparatus for effecting the premixing of the material and the delivery of it to the drum. In this form the hopper 1ª is divided into a plurality of compartments a, b, c, and d for the different primary materials, and these discharge into a premixing chamber 2ª which is pivoted at one end to the frame 9ª so that the mixing box may be moved up and down about its pivot rather than moving the entire hopper as in Fig. 1. The compartments of the hopper have valves or doors 3ª for controlling the discharge into the mixing chamber 2ª and the latter has a door 4ª for controlling the discharge into a receiving box 15ª. The mixing chamber 2ª is raised by means of lever mechanism 13ª and a chain 8ª limits the extent to which the mixing chamber may be dropped after being raised by the lever mechanism. The bucket conveyor 16ª delivers the primary mixture through a chute 18ᵃ to one end of the mixing drum 33ᵃ. At the opposite end of the drum there is a centrifugal distributor 32ᵃ fed from the box or boxes at the top. The construction and operation of the drum and the parts directly associated therewith may be substantially the same as that illustrated in Figs. 1, 2 and 2ᵃ. The feed boxes above the drum are shown as being at only one end rather than at both ends. The shaft of the worm in the feed boxes may be operated by a worm wheel 28ᵃ, and driven from a chain 29ᵃ.

In the construction shown in Figs. 5 and 6 the hopper 1ᵇ is arranged below a track 45 whereby it may be charged from trucks 46. The hopper may have a plurality of compartments which may discharge through openings regulated by doors 3ᵇ and all of the compartments may deliver into a premixing chamber 2ᵇ. This is shown as being mounted on wheels 6ᵇ on an inclined runway 7ᵇ so that it may be moved back and forth. The runway is preferably pivoted at one end so that the angle of inclination may be varied and the rate of feed regulated. The rear wall 47 and the side walls 48 are pivoted to the bottom wall of the premixing box, so as to accommodate themselves to different angles of the runway 7ᵇ. The bucket conveyor 17ᵇ delivers the material to the upper end of a revolving sifting drum 50 formed of sieves of different gauges and through which the material graded according to the sizes of the particles, is delivered to the compartments $a'$, $b'$, and $c'$ of a large hopper 1ᵇᵇ. Particles above a certain size are rejected by the sieve and received in a hopper 51 which delivers through a chute 52 to a crushing or grinding machine 53 which after the crushing or grinding operation returns the materials through a chute 54 to the hopper 1ᵇ. Each compartment of the hopper 1ᵇᵇ has a delivery door 3ᵇᵇ delivering into a premixing chamber 2ᵇᵇ which may be similar in most respects to the premixing chamber 2ᵇ and mounted for sliding movement back and forth on an inclined track, the inclination of which may be varied at will, as for instance by the supporting rod 55. The premixing chamber 2ᵇᵇ delivers to a box 15ᵇᵇ from which a bucket conveyor 16ᵇᵇ may deliver the material to a drum substantially the same as that shown in Fig. 1, or substantially the same as that shown in Fig. 3, the form shown in Fig. 3 being that illustrated in Fig. 5. The power for operating the various moving parts may be derived from a prime-mover 56 and may be transmitted through suitable sprockets, chains and gear wheels which are illustrated or indicated in the drawing, but which need not be described.

This rotary screen 50 is built especially to carry out the new mixing process as it is provided with a preliminary treatment drum section 57 in which there are arranged suitable mixers 58 in such number as may be required by the nature of the material to be mixed. This machine differs from previous sorting machines and sorting drums in its quick sorting action and labor saving feature, and shows an entirely new construction of sorting machine which is intended to carry as far as possible the preliminary treatment either in the form of sorting or in the form of distribution of materials, whereby for any individual kind of material the mixing action is increased to a maximum, the quality of the finished product being correspondingly enhanced. For instance, concretes of the highest strength are obtained from the most diversified materials such as ordinary concrete, light concrete for which slag both in large and small lumps is used, only sand being added, and all kinds of compound concrete made with cork waste, slag, ashes, light stone, etc.

In Figs. 7 and 8 I have shown a revolving drum construction which may receive the primary mixture prepared by such forms of apparatus as those previously described, and which may be used in place of the rotary drums of Figs. 1 and 3. The primary mixtures delivered from the bucket conveyor or other source may be dumped directly into the mixer 60, or may be dumped in front of the machine and shoveled or otherwise delivered to the mixer 60. This mixer revolves with the drum 33ᶜ. The mixer 60 may have helical blades 61 at its outer or receiving end for advancing and mixing the material, and a smooth cylindrical part 62 delivering to a worm 63. This worm feeds the material into the drum 33ᶜ. Liquid from a tank 64 may be delivered through a pipe 65, and regulating valve 66 to the interior of the mixer 60. The frame which supports the drum 33ᶜ may be carried by sets of wheels 67 and by jacking up one pair of wheels, the mixer and drum can be given greater or less inclination and corresponding variation in the speed of delivery of the material through the mixer and drum. A pointer 68 in the form of a pendulum pivoted on the frame at the upper end of the machine, and movable along a scale 69 may indicate the angle of inclination of the drum and mixer. At the end of the drum opposite to the mixer, there may be a feed box 24ᶜ receiving material through a screen and delivering it by means of a worm or screw 26ᶜ to a controlling valve 27ᶜ and a blower of centrifugal distributor 32ᶜ. This latter may be mounted above the discharge spout or outlet from the drum.

As long as the mixer is kept charged the rate of feed is regulated entirely by the angle given to the machine, and any quantity in excess fed to the mixer will be rejected by the latter. By this means, the duration of the mixing operation can be regulated as required. When a particularly intimate mixture is required, the machine is adjusted for very slow and thorough working, with the axis of the drum nearly horizontal. In the mixer the materials are thoroughly tumbled, mixed and rubbed together, and thus brought into condition for receiving the secondary mixture supplied by the centrifugal distributor 32°.

In carrying out my improved process the delivery of the materials is so regulated by the controlling valves or doors that in their condensed or shaken down condition they are in the proper proportions by volume, so that the finest materials will only substantially completely fill the interstices between the next coarser materials, and the mixtures of the various finer grades will fill the interstices between the particles or fragments of the coarsest material. Thus the total volume of the mixture is not materially greater than the volume occupied by the coarsest ingredients alone.

Having thus described my invention, what I claim as new and desire to secure by Letters Patent is:—

1. The process of working up and mixing a plurality of granular materials, consisting in subjecting the several materials to agitation whereby the surfaces of the granules are abraded, with retention in the mass of the particles detached by abrasion, and concurrently commingling streams of the agitated materials under pressure in a confined space, agitating the mixture in the said space, and withdrawing a constricted stream of the mixture from the said space.

2. The process of working up and mixing a plurality of granular materials as claimed in claim 1, followed by adding a powdered material to the mixture and agitating the mixture together with the added powder.

3. Apparatus for the purpose set forth comprising in combination a mixing chamber having a constricted outlet, and means for agitating and abrading granular materials outside said chamber and concurrently introducing streams of said agitated materials into said chamber and moving the mixture through the said chamber towards said outlet.

4. Apparatus for the purpose set forth, comprising in combination a mixing chamber having a constricted outlet, means for agitating and abrading granular materials outside said chamber and concurrently introducing streams of said agitated materials into said chamber and moving the mixture through the said chamber towards said outlet, and means for conveying a further material to the mixture and agitating the mixture together with said added material.

5. Apparatus for the purpose set forth, comprising in combination a mixing chamber having a constricted outlet, means for agitating and abrading granular materials outside said chamber and concurrently introducing streams of said agitated materials into said chamber and moving the mixture through the said chamber towards said outlet, and means for conveying a further material to the mixture and agitating the mixture together with said added material, a rotary mixing drum, means for conveying the mixture issuing from said chamber to said drum, and means for projecting a further granular material into said drum at the end opposite to that at which the mixture enters.

6. The process of working up and mixing a plurality of granular materials consisting in first mixing and agitating the said materials, with abrasion of the surfaces of the granules by the agitation, then screening the mixed materials, to sort the granules according to size, and then subjecting the several sorted materials to agitation, whereby the surfaces of the granules are again abraded, with retention in the mass of the particles detached by abrasion, and concurrently commingling streams of the agitated materials under pressure in a confined space, agitating the mixture in the said space, and withdrawing a constricted stream of the mixture from the said space.

7. Apparatus for the purpose set forth, comprising in combination a rotary screening drum having a series of sieves of different gauges and having also at the intake end a short preliminary mixing chamber and agitating mechanism in said chamber, hoppers arranged severally to receive granular materials discharged from said series of sieves, a mixing chamber in communication with the outlets of said hoppers, said chamber having a constricted outlet, and means for collectively agitating said hoppers and the second mentioned mixing chamber, for concurrently discharging streams of material from said hoppers into said chamber and discharging a constricted stream of mixed materials from said chamber.

Signed at Paris, France, this 20th day of June, A. D. 1922.

EMILE SPRENGER.